No. 630,057. Patented Aug. 1, 1899.
C. M. JOHNSON.
VALVE AND VALVE GEARING FOR EXPLOSION ENGINES.
(Application filed Sept. 9, 1898.)
(No Model.) 4 Sheets—Sheet 3.
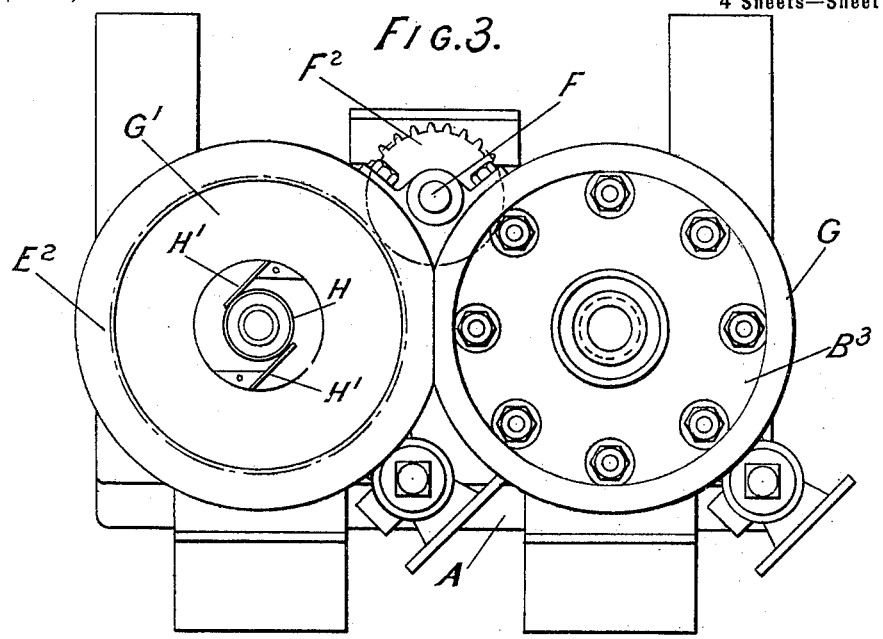
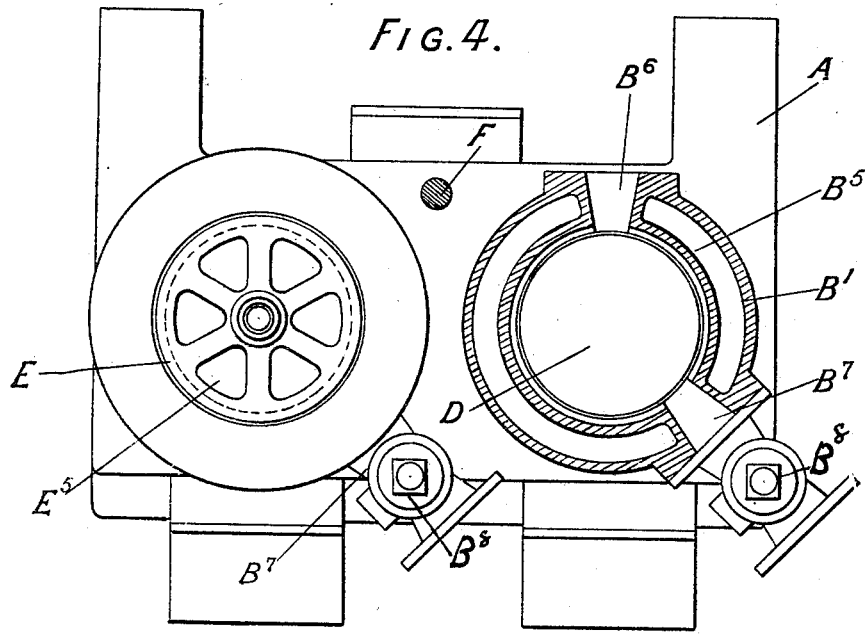
THE NORRIS PETERS CO., PHOTO-LITHO., WASHINGTON, D. C.

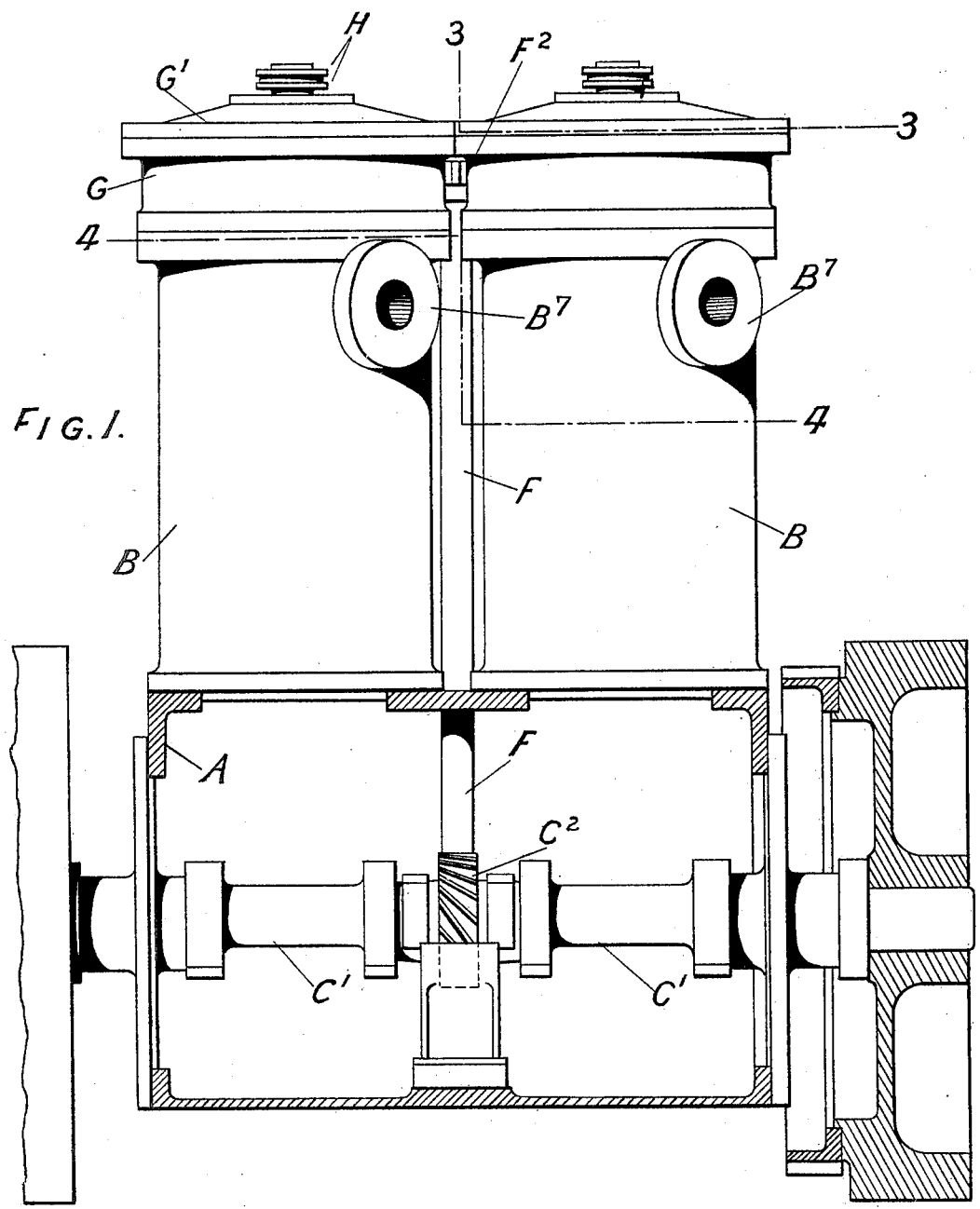

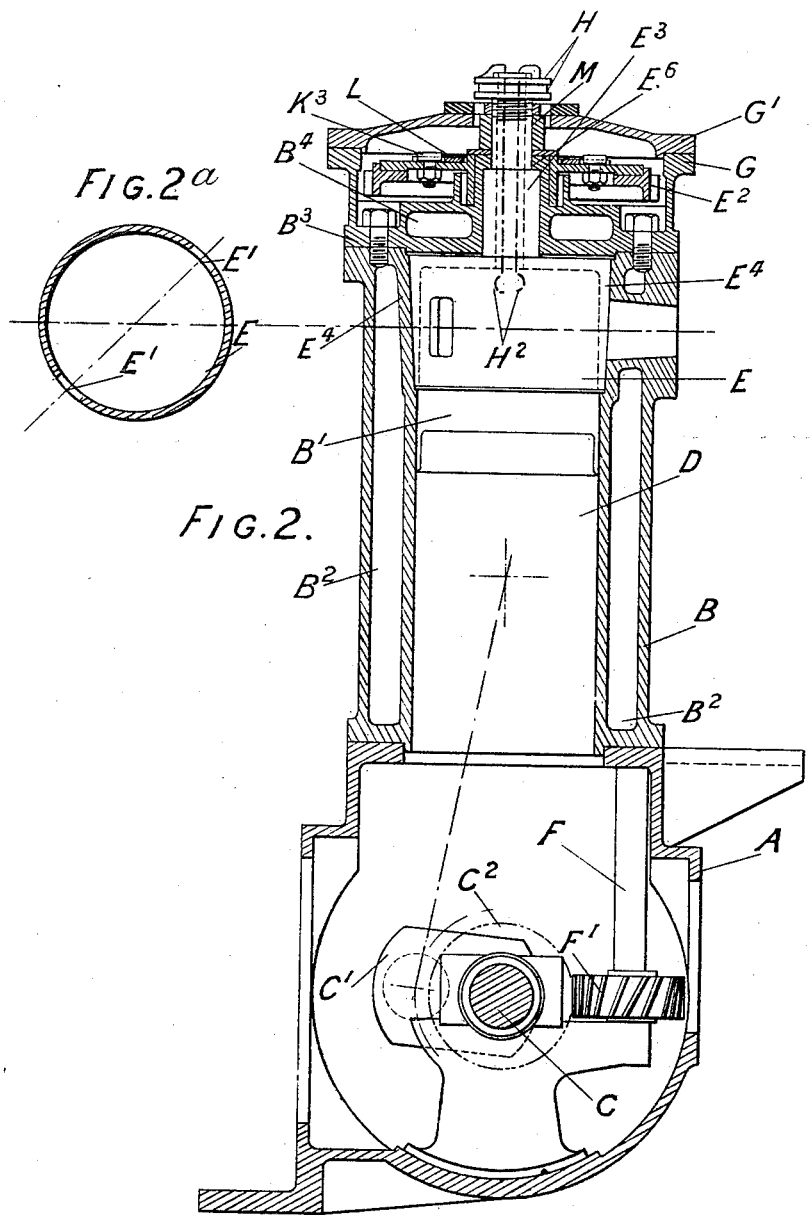

No. 630,057. Patented Aug. 1, 1899.
C. M. JOHNSON.
VALVE AND VALVE GEARING FOR EXPLOSION ENGINES.
(Application filed Sept. 9, 1898.)
(No Model.) 4 Sheets—Sheet 4.
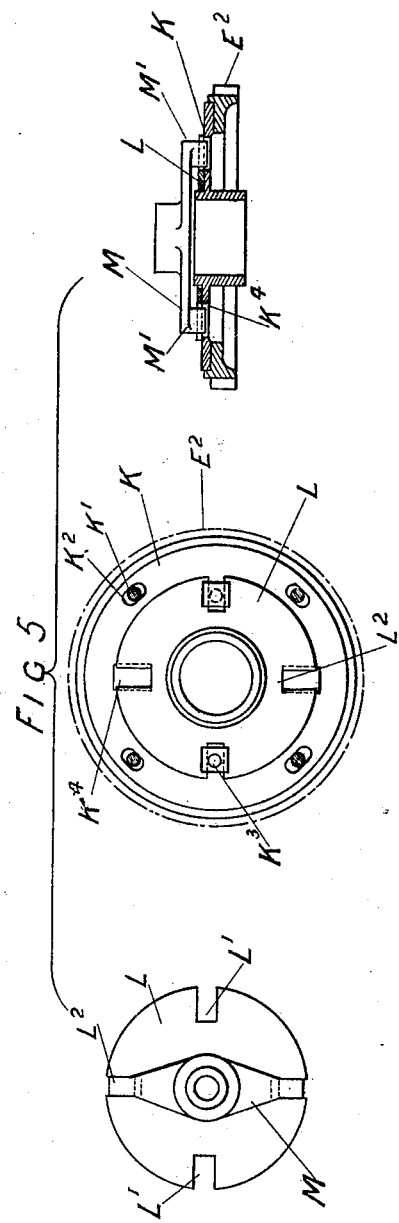

UNITED STATES PATENT OFFICE.

CHARLES M. JOHNSON, OF NEW YORK, N. Y.

VALVE AND VALVE-GEARING FOR EXPLOSION-ENGINES.

SPECIFICATION forming part of Letters Patent No. 630,057, dated August 1, 1899.

Application filed September 9, 1898. Serial No. 690,577. (No model.)

*To all whom it may concern:*

Be it known that I, CHARLES M. JOHNSON, a citizen of the United States of America, and a resident of New York, State of New York, but temporarily residing at 22 and 23 Laurence Pountney Lane, London, in the county of Middlesex, England, have invented certain new and useful Improvements in Valves and Valve-Gearing Particularly Applicable to Explosion-Engines, of which the following is a specification.

This invention relates to valves, and is particularly applicable to explosion-engines.

According to this description of the invention I place inside the cylinder of, say, an explosion-engine a cup-shaped valve, the external contour of which is preferably conical. The valve can be placed at the cylinder-head end and has a stem, preferably tubular, extending through the cylinder-head. The valve is balanced by admitting the pressure to the back of the valve, preferably through perforations in the bottom of the cup. Ports for the admission and exhaust of steam or gases are provided in the wall of the cup-shaped valve, preferably so as to balance one another as regards the side pressure on the valve, and the valve, as shown, is rotated by means of toothed gearing driven from the crank-shaft of the engine and operating upon the aforesaid stem of the valve which protrudes through the cylinder-head.

One construction of valve and gearing as applied to a twin explosion-engine will now be described by way of example, reference being had to the accompanying drawings, of which—

Figure 1 is a front elevation of the twin engine; Fig. 2, a vertical section through one of the cylinders; Fig. 2ª, a horizontal section through the valve; Figs. 3 and 4, sectional plans on the lines 3 3 and 4 4 of Fig. 1, respectively. Fig. 5 shows details of the valve-gearing.

With reference first to Figs. 1 and 2, A is a base or bed plate, upon which are mounted two water-jacketed cylinders B, of which B' is the steam or fluid space and B² the space for the cooling-water. The crank-shaft is shown at C and the cranks at C', the connecting-rods being omitted for the sake of clearness. The trunk-piston is shown at D and the cup-shaped valve hereinbefore referred to at E. The crank-shaft C drives the valve E by means of toothed gearing C², F' F' being a toothed wheel mounted upon a vertical shaft F, which drives the valve by means of toothed gearing F² E², E² being a spur-ring attached to the valve-stem E³. The outer surface of the valve E is made conical, as seen at E⁴, and the cylinder is bored out at that part, so as to form a seating for the valve. Provision is made in the cylinder-head B³ for water-jacketing it by means of water circulating through the spaces B⁴. The spur-ring E² is attached to the valve-stem E³ by a device which will be hereinafter more particularly described and is, together with this device, inclosed within a casing G and cover G', so as to exclude dirt. The upper extreme of the valve-stem E³ carries two contact-rings H, upon which brushes H' (see Fig. 3) press, so as to make electrical contact therewith, the charge within the cylinder being fired electrically by means of wires H², passing through the valve-stem and connected to the said rings H. The device by which the spur-ring E² is attached to and drives the valve-stem comprises the parts shown in Fig. 5. The spur-ring E² is attached to a wheel K by means of bolts K' passing through slots K² in the wheel. Other bolts K³ serve to drive a disk L, the bolts K³ engaging slots L' in the periphery of the disk L, so as to allow the latter to move along the line connecting the centers of the bolts K³ relatively to the wheel K, but not allowing it to move in a direction at right angles to this. Other slots L² in the said disk engage the downwardly-extending portions M' of a double arm M, the arm M being connected to the valve-stem. To avoid the possibility of the portions M' of the arm M engaging with the disk K, large slots K⁴ are formed therein below the slots L², so as to allow the portions M' to have a certain amount of play therein even in the event of their projecting sufficiently low to enter the slots K⁴. This device enables the valve to be driven by means of the spur-ring E², even provided the valve-stem E³ should not be exactly central within the ring, and serves, broadly, to allow of certain errors in the adjustment of the ring E² in regard to the valve-stem without causing any side stresses upon the valve-stem E³ or conical valve E. The slotted holes K² in the wheel K permit of a fine adjustment of the ring E² relatively to the wheel K, and thus afford a means of adjusting the position of the valve-ports E' relatively to the position of the cranks when the adjustment of one tooth of the spur-gearing either at the top or bottom of the shaft F would be too course.

The ports E' of the valve E are so arranged that the effect of the steam-pressure on the sides of the valve is maintained in balance. In the example illustrated the valve is provided with two ports only; but more ports may be used if it is desired to rotate the valve at a slower speed, care being taken to arrange them symmetrically around the circumference, so as to maintain the balance aforesaid. The upper surface of the valve—that is, the bottom of the cup—is perforated, so as to allow pressure to find access to the space between the top of the valve and the cylinder-head B³. These perforations E⁵, as seen in Fig. 4, may conveniently be so enlarged as to leave only radial arms connecting the circumference of the valve with the valve-stem. The valve constructed and shown as illustrated in the drawings is therefore perfectly balanced, with the exception of the pressure on the area of the valve-stem. This upward pressure is taken by the cylinder-head B³, a shoulder E⁶ being formed upon the valve-stem and bearing against a recess formed to receive it in the cylinder-head. The admission-passages to the cylinder are lettered B⁷ and the exhaust-passages B⁶. The gearing between the crank-shaft and the valve is so proportioned in the example illustrated that the ports E' (see Fig. 2ᵃ) in turn completely control the distribution—that is to say, one of the ports will pass from the suction-port B⁷, around the shorter arc of the circumference of its path, past the exhaust-valve B⁶, to a point diametrically opposite the port B⁷ in one complete cycle of the engine, when, as will be obvious, the other valve-port E' will be in a position to take its place, the first meanwhile traveling idly against the dead-wall of the cylinder around until it again reaches the port B⁷. If a three-port valve were employed, the ports would be symmetrically arranged circumferentially and the speed of rotation again be in inverse proportion in relation to that of the crank-shaft to the number of ports. Thus in the example shown in the drawings four strokes—say suction, compression, ignition, and exhaust—may occur during one half-revolution of the valve, the crank-shaft in this case making four complete revolutions to every revolution of the valve.

Although this invention has been described and illustrated as applied to a twin explosion-engine, it may obviously be equally conveniently applied to a single engine, and the balanced valve described may be applied to a steam-engine or other fluid-pressure apparatus.

Many of the details of the construction illustrated in the accompanying drawings may obviously be varied without departing from the spirit of this invention. For example, this invention is not limited to the arrangement of slotted disks by which the motion of rotation is imparted to the valve at one end of the cylinder alone, nor is it limited to an electrical ignition of the explosive charge or ignition through the stem; but ignition may be effected electrically or otherwise through the valve-ports, if preferred.

In Fig. 4 the receiving-ports are provided with a three-way cock B⁸ B⁸, which is used for the purpose of cutting in or out either engine as and when required, so as to increase and decrease the power. In motor-car work it is a well-known fact that if the explosive-engine is to take the place of a horse the engine must be able to develop one-eighth-horse power at one time and from four to eight horse power at another. In order to make this engine suitable for motor-car work, I provide each cylinder of the engine with a three-way cock, as is shown, so that simply by turning the three-way cock on one cylinder (if two cylinders only are used on the engine) I can cut off the explosive mixture from this or one cylinder, and that cylinder will be running idle, its piston drawing in and expelling air through the remaining passage of the three-way cock; but when more power is again required I can turn the three-way plug so that the explosive mixture will be taken into that cylinder and that cylinder put into active operation again.

I do not limit myself to an explosion-engine of two or more cylinders nor to two separate-acting engines with clutch arrangements for cutting in and out to increase and decrease the power; but

I claim—

1. In an explosive-engine, the combination of a valve-seat having admission and exhaust passages, a valve seated in said seat and having ports adapted to register with said passages, a ring encircling said valve, a wheel substantially concentric with said ring and movable on its axis relative to the same, means for connecting said ring and said wheel and limiting their relative movements, means for adjustably connecting said wheel with said valve, and means for rotating said ring.

2. In an explosive-engine, the combination of a valve-seat having admission and exhaust passages, a valve seated in said seat and having ports adapted to register with said passages, a spur-ring encircling said valve, a wheel substantially concentric with said ring and movable on its axis relative to the same and provided with concentric slots, bolts projecting from said ring and engaging with said slots to connect said ring and said wheel and to limit their relative movements, means for adjustably connecting said wheel with said valve, and means for rotating said spur-ring.

3. In an explosive-engine, the combination of a valve-seat having admission and exhaust passages, a valve seated in said seat and having ports adapted to register with said passages, a spur-ring encircling said valve, a wheel substantially concentric with said ring and movable on its axis relative to the same, means for connecting said ring and said wheel and limiting their relative movements, a disk substantially concentric with and connected to said wheel and having a radial movement relative to the same, means for adjustably connecting said disk with said valve, and means for rotating said spur-ring.

4. In an explosive-engine, the combination of a valve-seat having admission and exhaust passages, a valve seated in said seat and having ports adapted to register with said passages, a spur-ring encircling said valve, a wheel substantially concentric with said ring and movable on its axis relative to the same and provided with concentric slots, bolts projecting from said ring and engaging with said slots to connect said ring and said wheel and to limit their relative movements, a disk substantially concentric to said wheel and provided with diametrically opposite recesses, bolts projecting from said wheel and engaging with said recesses to connect said wheel and said disk and to allow a radial movement of the latter relative to the former, means for adjustably connecting said disk with said valve, and means for rotating said spur-ring.

5. In an explosive-engine, the combination of a valve-seat having admission and exhaust passages, a valve seated in said seat and having ports adapted to register with said passages, a spur-ring encircling said valve, a wheel substantially concentric with said ring and movable on its axis relative to the same, means for connecting said ring and said wheel and limiting their relative movements, a disk substantially concentric with said wheel and connected to the same and having a radial movement, an arm mounted on said valve and engaging with said disk, and means for rotating said spur-ring.

6. In an explosive-engine, the combination of a valve-seat having admission and exhaust passages, a valve seated in said seat and having ports adapted to register with said passages, a spur-ring, a wheel connected with said ring and having a radial movement, a disk connected with said wheel and having a radial movement, an arm mounted on said valve and engaging with said disk, and means for rotating said spur-ring.

In witness whereof I have hereto set my hand, in the presence of two subscribing witnesses, this 19th day of August, 1898.

CHARLES M. JOHNSON.

Witnesses:
C. HADINGHAM,
F. ALFORD ARMSTRONG.